United States Patent [19]

Culver et al.

[11] 4,282,486
[45] Aug. 4, 1981

[54] DUAL FOCUSED RESISTIVITY LOGGING METHOD AND APPARATUS WITH DYNAMIC RANGE REDUCTION

[75] Inventors: Richard B. Culver, Houston; Francis X. Bostick, Austin, both of Tex.

[73] Assignee: Dresser Industries, Inc., Dallas, Tex.

[21] Appl. No.: 966,292

[22] Filed: Dec. 4, 1978

[51] Int. Cl.$^3$ .............................................. G01V 3/24
[52] U.S. Cl. ..................................... 324/371; 324/375
[58] Field of Search ............... 324/373, 374, 375, 366, 324/371

[56] References Cited

U.S. PATENT DOCUMENTS

| | | | |
|---|---|---|---|
| 2,712,630 | 7/1955 | Doll | 324/374 X |
| 2,776,402 | 1/1957 | Kokesh | 324/373 |
| 3,056,917 | 10/1962 | Tanguy | 324/366 |
| 3,452,269 | 6/1969 | Welz | 324/373 |
| 3,660,755 | 5/1972 | Janssen | 324/375 |
| 3,772,589 | 11/1973 | Scholberg | 324/373 |
| 3,973,188 | 8/1976 | Attali et al. | 324/374 |

*Primary Examiner*—Gerard R. Strecker
*Attorney, Agent, or Firm*—Richard M. Byron

[57] ABSTRACT

Method and apparatus for reducing the dynamic range of measure signals encountered in simultaneously obtaining two focused logs of formation resistivity with different depths of investigation and means for providing the required electrical connections of the electrode system. The apparatus includes an electrode system having a central electrode, a near and far pair of current electrodes, respectively shortcircuited, and aligned symmetrically on both sides of the central electrode, and a near and far pair of measure electrodes, respectively shortcircuited, and aligned symmetrically between the central electrode and the near pair of current electrodes. A signal detected on the near measure electrode pair at a preselected frequency and a first and second signal are combined to produce first and second combined voltages which are used in the production of a first and second frequency, $f_1$ and $f_2$, respectively. Electrode drive signals, each at a different, preselected frequency are generated, each having an amplitude functionally related to the deep resistivity measure signal with the frequencies selected to permit simultaneous measurement in a borehole of the electrical resistivities of the subsurface earth formations over relatively small and relatively large lateral distances from the wall of the borehole. The varying amplitude of the electrode drive signals acts to reduce the dynamic ranges in the measured currents and voltages impressed across the formation permitting an increase in the measurement accuracy over a smaller measurement range.

8 Claims, 7 Drawing Figures

DUAL FOCUSED RESISTIVITY LOGGING METHOD AND APPARATUS WITH DYNAMIC RANGE REDUCTION

BACKGROUND OF THE INVENTION

1. Field of the Invention

This invention relates to a method and apparatus for electrical well logging and, in particular, to a method and apparatus designed to simultaneously measure, in a borehole, the electrical resistivities of the subsurface earth formations extending over relatively small and relatively large lateral distances from the wall of the borehole. Even more particularly, the invention relates to a method and apparatus utilizing linear components in a subsurface electronic circuit for reducing the dynamic range of the voltages and currents which are measured to derive ratios indicative of the apparent resistivity of the earth formations surrounding the borehole.

2. Description of The Prior Art

It is well known in the art of electrical well logging to use electrical fields produced and adjusted to focus the current emitted by the electrode in the borehole, forcing the current to follow a path confined to a zone substantially perpendicular to the wall of the borehole. Accordingly, the early logs were obtained by recording the variations and the differences in potential, appropriately chosen and related to the flow of current through subsurface earth formations, and deriving the electrical resistivities of the formations extending over relatively large lateral distances from the wall and borehole. Other types focused the emitted current over shorter lateral distances so that the logs derived from the current flow measured represented, with greater exactitude, the electrical resistivities in the neighborhood of the wall. The influences of the liquid filling the borehole, mudcake and material located at a great distance from the wall of the borehole being practically eliminated thereby.

One prior art apparatus, described in U.S. Pat. No. 2,712,630 issued on July 5, 1955 to Doll, is directed to the use of a system of electrodes whereby controlled electric fields emitted into the borehole, in a path perpendicular to the wall thereof, may be focused such that the earth formations at different lateral depths from the wall of the borehole are measured.

In trying to provide near simultaneous determination of the resistivities at various lateral depths, another prior art apparatus, described in U.S. Pat. No. 3,660,775, issued on May 2, 1972 to Janssen, utilizes a similar set of electrodes, connected to permit switching electrode focusing of the current to measure resistivities at medium or far lateral distances from the borehole simultaneously. The apparatus combines the measurements to provide a determination of the apparent resistivity of the earth formation. Commutating the signals between sets of electrodes during the traverse of the borehole by the logging instrument permits nearly simultaneous medium and far distance determinations of the resistivities at a particular lateral portion of the borehole.

More recently, the prior art has again been directed to circuitry utilizing a pair of frequencies, suitably connected to provide for the simultaneous measurement of the near and far resistivities of the earth formations. Notably, U.S. Pat. No. 3,772,589 issued to Scholberg on Nov. 13, 1973 discloses apparatus of the type similar to that used by Doll.

Additionally, Scholberg recognized that in resistivity well logging applications, as with many measuring systems, it is required to measure the value of a parameter to within some specified degree of accuracy rather than just detecting a change in that parameter. The precision to which the unknown is to be resolved and the range of the values of the unknown determine the dynamic range requirements of the measuring system.

By reducing the dynamic range of the measured parameters, increased measurement accuracy can be achieved over smaller measurement ranges.

The above mentioned Scholberg apparatus permits the wide dynamic ranges encountered in measuring formation resistivities to be reduced by maintaining constant power for impressing the measuring currents and voltages across the formation. However, the system must of necessity rely on the use of non-linear circuit elements such as shown in the surface electronics portion of the Scholberg patent.

The disadvantages of the prior art are overcome and novel methods and apparatus are provided for simultaneously determining the apparatus resistivities of each formations surrounding a borehole at near and far distances utilizing linear circuit elements interconnected in a subsurface electronic circuit which reduces the dynamic measurement range of the signals within the surrounding earth formations.

SUMMARY OF THE INVENTION

The present invention is directed to a method and apparatus for reducing the dynamic measurement range of voltages and currents which are measured near the borehole and which reflect the resistivity at near and distant lateral distances from the borehole, with the measurements used to form ratios for determining the apparent resistivity of the earth formations surrounding the borehole. The apparatus of the invention includes a system of electrodes distributed longitudinally along a logging instrument suspended from a cable and capable of traversing the borehole. The system includes a central electrode and four pair of electrodes which are respectively shortcircuited and aligned symmetrically on both sides of the central electrode at increasing distances therefrom. The first two pairs of electrodes situated nearest to the central electrode are designated measurement electrodes and the remaining pairs of electrodes situated the furthest from the central electrode as current electrodes.

To provide for independent simultaneous measurement of the formation resistivity at two different radial distances from the borehole a two frequency system is used. The frequencies are denoted as $f_1$ and $f_2$, 32 Hz and 128 Hz respectively where $f_1$, the lower of the two, is used for the deeper measurement. Operation of the deep measurement requires an internal shortcircuit between both current electrode pairs of frequency $f_1$. Electrical excitation for this measurement is connected between the shorted electrode pairs and a remote current return electrode.

The shallow measurement requires that electrical excitation at frequency $f_2$ be connected between the current electrode pairs. Impedance between either of these two pairs and the remote current return electrode should be essentially infinite at the shallow measurement frequency $f_2$.

The deep measurement excitation is provided by a current amplifier having one output connected to the shorted current electrode pairs and another connected to the remote current return electrode and provides excitation in the form of an electrical current at the frequency $f_1$. Because the current amplifier has a large, essentially infinite, output impedance it also presents an open circuit between the two points to which its outputs are connected. This satisfies the impedance requirement for the shallow measurement at frequency $f_2$.

Excitation for the shallow measurement is obtained from a voltage amplifier connected between the two current electrode pairs. Excitation at frequency $f_2$ is in the form of a potential difference developed between the two electrode pairs. Further, as the output impedance of a voltage amplifier is essentially zero, the two pairs act as a short-circuit at frequency $f_1$ as required for the deep measurement.

Additionally, the present invention is directed to reducing the dynamics ranges of measured parameters. This results in increasing the accuracy of measurements taken over a small measurement range to equal the accuracy obtained by taking smaller measurements over much larger ranges. This reduction in measurement range permits the use of simplified, linear circuitry to implement.

According, in developing the drive signal for the current amplifier, a first reference DC voltage is linearly combined with a signal representative of the detected deep measure voltage and the combined signal passed through a chopper acting at a preselected frequency $f_1$ to produce a square wave signal at frequency, $f_1$. Extracting the fundamental of the square wave signal produces a sinusoidal drive signal for the current amplifier at frequency $f_1$. Further, mixing the deep log measure voltage with the constant reference voltage prior to chopping allows the signals to vary, providing a reduction in the dynamic range of the measured signals.

The drive circuit for the voltage amplifier supplying excitation for the shallow measurement is similar to that used in developing the deep measurement drive signal except that a second preselected frequency $f_2$ is used as the chopping frequency. Similarly, the fundamental of the square wave signal produced at frequency $f_2$ is extracted and applied to the input of the voltage amplifier output stage. Again, mixing the deep log measure voltage with a second DC reference signal prior to chopping reduces the dynamic range of the shallow measurements as above-described for the deep measurements.

The features and advantages of the present invention will become apparent from the following detailed description when considered in connection with the attached drawings.

DETAILED DESCRIPTION OF A PREFERRED EMBODIMENT

Figure 1:
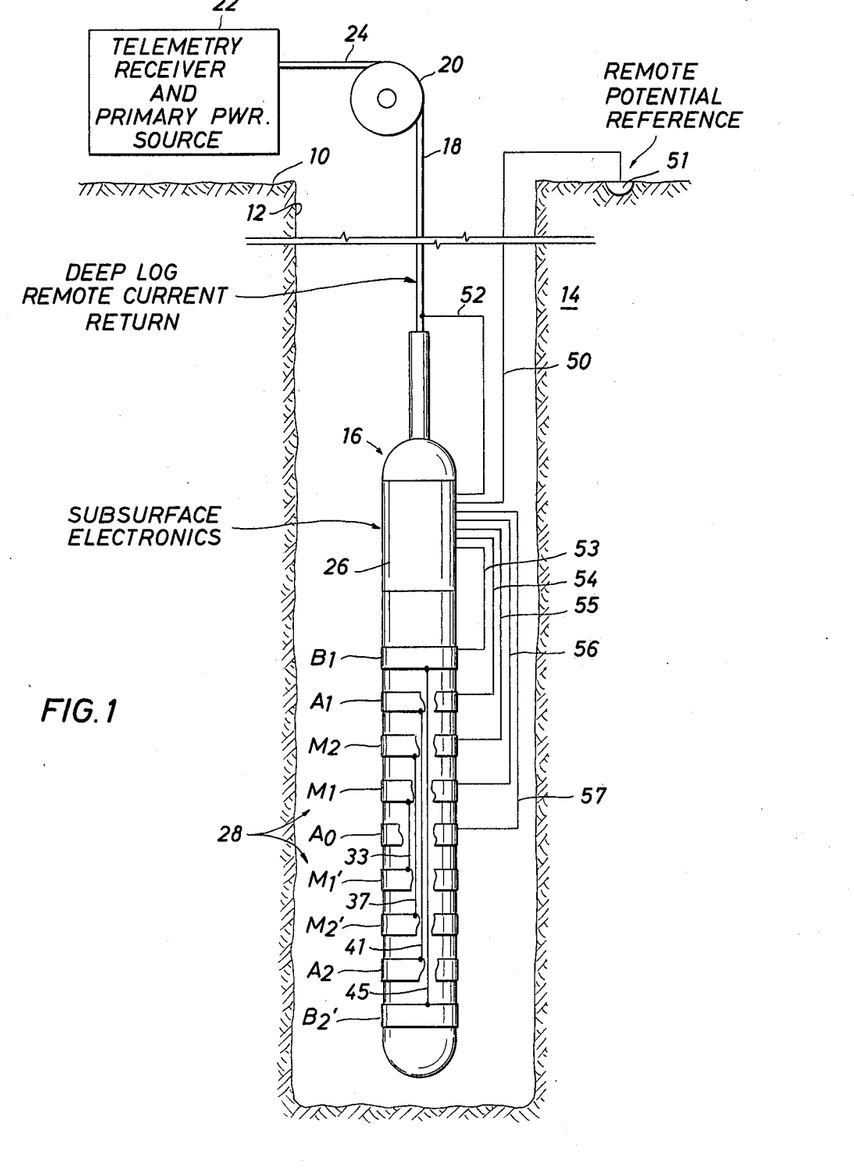
FIG. 1 is a schematic representation of a well logging operation showing a logging instrument containing the subsurface electronic circuit of the present invention.

Referring now to the drawings, FIG. 1 illustrates a portion of the earth's surface 10 into which a borehole 12 has been drilled, thereby penetrating the subsurface formation 14. Disposed within the borehole is a subsurface instrument 16 which is adapted to be raised and lowered therein by means of a multi-conductor logging cable 18. Surface apparatus includes a cable drum 20 onto which the logging cable 18 is wound or from which it is unwound, when the instrument 16 is caused to traverse the borehole 12. Additionally, the surface apparatus includes a telemetry receiver and primary power source 22 connected to logging cable 18 through drum 20 by a signal cable 24. The power means for driving drum 20 as well as a measuring wheel used to indicate the depth of the logging instrument 16 in borehole 12 by measuring the playout of cable 18 are both conventional and therefore not shown.

The essential part of logging instrument 16 consists of a subsurface electronic system 26 containing the signal generation and measuring electronics of the present invention as will be hereinafter explained. Further, an electrode system, indicated generally at 28, is distributed longitudinally along the length of instrument 16 and comprises a central electrode $A_0$ and four electrode pairs, $M_1-M_1'$, $M_2-M_2'$, $A_1-A_2'$ and $B_1-B_2$ placed symmetrically about $A_0$ as indicated in FIG. 1 and more particularly described in U.S. Pat. No. 3,660,755 which issued May 2, 1972 to Janssen. Also as indicated in Janssen, each electrode pair is shortcircuited by insulated conductors 33, 37, 41 and 45 respectively, the purpose of which has been more fully explained in the above-mentioned Janssen patent. As will be hereinafter explained, the central electrode $A_0$ and the shorted pairs extending longitudinally outward therefrom are connected to the subsurface electronic system 26 by conductors 57, 56, 55, 54 and 53 respectively. Additionally, and again the purpose of which will be hereinafter explained, subsurface electronics section 26 is provided with a deep log remote current return conductor 52 attached to the armored sheathing of cable 18 and with a remote potential reference conductor 50 extending therefrom to a remote potential reference point 51 located on the earth's surface 10.

Figure 2:
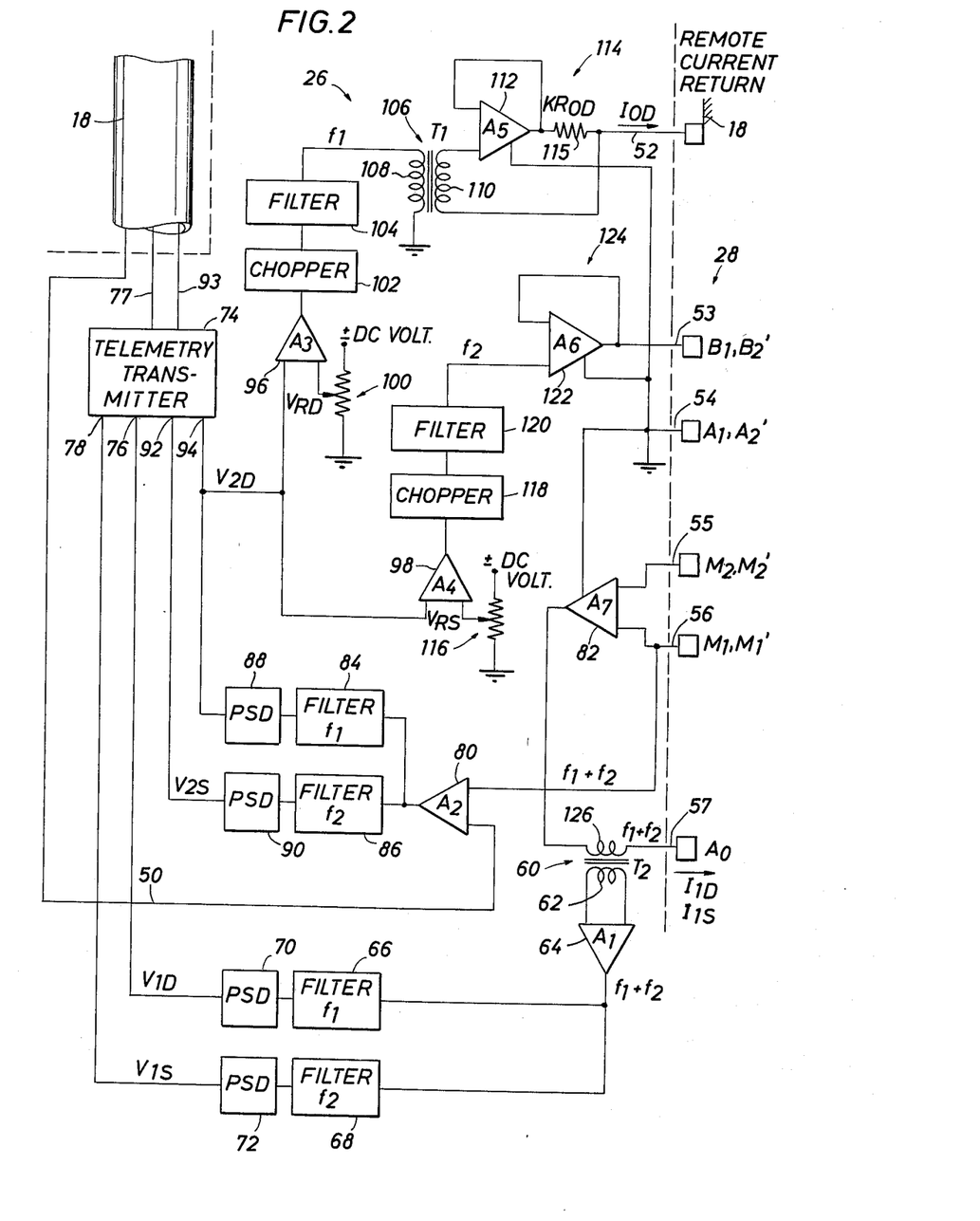
FIG. 2 is a schematic representation of the subsurface electronics circuit of the present invention.

Referring now to FIG. 2, a schematic representation of the electronic circuits making up the subsurface electronic section is shown generally at 26. A current transformer 60 is positioned to sample the current excitation supplied central electrode $A_0$ over conductor 57. The secondary coil of transformer 60 is connected across the inputs of an amplifier 64 with the output thereof coupled into two conventional band pass filters 66 and 68. Band pass filter 66 is designed to pass a first preselected frequency $f_1$ and band pass filter 68 to pass a second preselected frequency $f_2$. The signals at frequencies $f_1$ and $f_2$ developed in filters 66 and 68 are then coupled into phase-sensitive detectors 70 and 72 respectively.

Phase-sensitive detector 70 produces a DC voltage signal $V_{1D}$, which is functionally related to the current sensed by transformer 60 at frequency $f_1$. Phase-sensitive detector 72 similarly produces a DC voltage signal, $V_{1S}$, which is functionally related to the current sensed by transformer 60 at frequency $f_2$.

Voltage signals $V_{1D}$ and $V_{1S}$ are thereafter coupled into a telemetry encoder/transmitter 74 through input ports 76 and 78 respectively. After encoding signals $V_{1D}$ and $V_{1S}$ are operatively coupled into surface electronics system 22 over and insulated conductor 77 which forms a part of logging cable 18.

Electrode pair $M_1-M_1'$ is connected to one input of an amplifier 80 with the second input connected by conductor 50 to the remote potential reference 51 situated on the earth's surface 10. The output of amplifier 80 is coupled into a second pair of conventional band pass filters 84 and 86, with filter 84 designed to pass signals at frequency $f_1$ and filter 86 designed to pass signals at frequency $f_2$. The $f_1$ and $f_2$ signals thus passed are coupled into phase sensitive detectors 88 and 90 respectively. Detector 88 develops a voltage signal $V_{2D}$ having an amplitude functionally related to the potential, at frequency $f_1$, developed between measure electrodes pair $M_1-M_1'$ and the remote potential reference 51. Detector 90 develops a voltage $V_{2S}$ having an amplitude functionally related to the potential at frequency $F_2$, developed between measure electrodes pair $M_1-M_1'$ and the remote potential reference 51. Signals $V_{2D}$ and $V_{2S}$ are coupled into the telemetry/encoder transmitter 74 through inputs 94 and 92 respectively. The signals are then encoded, as were the signals from detector 70 and 72, for transmission over conductor 93, also forming a part of logging cable 18, and coupled into surface electronics 22.

Voltage signal $V_{2D}$ is additionally coupled into one input of an amplifier 96 with the remaining input thereof connected to a first DC reference voltage source 100 such that $V_{2D}$ and the DC voltage are linearly combined. The combined signal is then passed through a chopper 102 to derive a square wave signal at frequency $f_1$. The square wave signal is thereafter coupled into a narrow band pass filter 104 which extracts the fundamental of the square wave signal to produce a sinusoidal drive signal at frequency $f_1$. Drive signal, $f_1$, is impressed across the primary coil 108 of a transformer 106 with the secondary coil 110 thereof having one output lead connected to an input of an amplifier 112. The remaining output lead of secondary coil 110 and the remaining input of amplifier 112 are so connected with a series output resistor 115 as to form a current amplifier shown generally at 114. The outputs of current amplifier 114 are connected by conductors 52 and 54 to the remote current return forming the armored sheathing of logging cable 18 and current electrode pair $A_1-A_2'$. As will be hereinafter explained, the output signal from current amplifier 114 is also coupled into current electrode pair $B_1-B_2'$ which are shorted to electrode pair $A_1-A_2'$.

Voltage signal $V_{2D}$ is also linearly combined in an amplifier 98 with a second DC reference voltage developed in source 116 and the resulting signal 15 thereafter coupled through a chopper 118 to form a square wave signal at the frequency $f_2$. The square wave signal is then coupled through a narrow band pass filter 120 to extract a fundamental signal thereof to produce a sinusoidal drive signal which is coupled into one input of an amplifier 122. Amplifier 122 has an output connected to the remaining input in a feedback connection forming a voltage amplifier shown generally at 124. The outputs of amplifier 122 are coupled into electrodes $B_1-B_2'$ and electrodes $A_1-A_2'$ over conductors 53 and 54, respectively.

The output impedance of an operational amplifier connected as a voltage amplifier circuit is essentially zero, whereby, at frequency $f_1$, the voltage amplifier 124 acts as a shortcircuit allowing the current amplifier to be connected simultaneously to $A_1-A_2'$ and $B_1-B_2'$ as above-mentioned. Further, an operational amplifier connected as a current amplifier circuit has a large, essentially infinite, output impedance, whereby amplifier 114 presents an open circuit between electrode pairs $A_1-A_2'$ and $B_1-B_2'$, connected to one output of amplifier 114, and the remote current return 52, connected to the remaining output of amplifier 114.

The remaining shorted pairs of electrodes, measurement electrode pairs $M_1-M_1'$ and $M_2-M_2'$, are respectively connected to an input of a high-gain amplifier 82, the ouput of which is coupled through the primary coil 126 of transformer 60 into central electrode $A_0$, with currents $I_{1D}$ and $I_{1S}$ impressed through electrode $A_0$ into the surrounding formation at frequencies $f_1$ and $f_2$.

Figure 3:
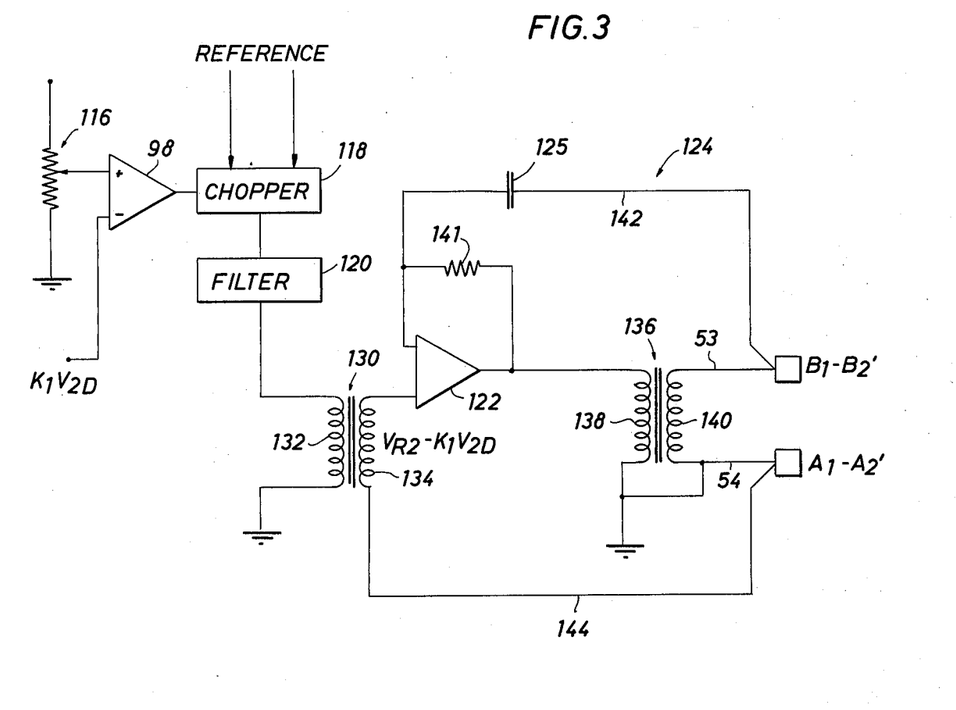
FIG. 3 is a schematic representation of one drive circuit including the voltage amplifier of FIG. 2.

Referring now to FIG. 3, the voltage amplifier 124 of FIG. 2 is shown in more detail. The output signal of filter 120 is impressed across the primary coil 132 of transformer 130 with one lead of the secondary coil 134 connected to a first input of amplifier 122 and the remaining lead of secondary coil 134 connected to electrode pair $A_1-A_2'$ by conductor 144. The second input of amplifier 122 is connected to electrode pair $B_1-B_2'$ thru capacitor 125 by conductor 142. The output of amplifier 122 is impressed across the primary coil 138 of a step-down transformer 136 and the output leads of the secondary coil 140 are connected to electrode pairs $B_1-B_2'$ and $A_1-A_2'$ by conductors 53 and 54, respectively. A resistor 141 is connected between the output and the second input of amplifier 122 to provide DC stability for the amplifier.

Output transformer 136 is utilized to provide a better match between the output capabilities of amplifier 122 and the load impedance measured between electrode pairs $A_1-A_2'$ and $B_1-B_2'$. Additionally, the characteristics of an ideal voltage amplifier are more effectively realized by providing separate feedback conductors 142 and 144 between electrode pairs $A_1-A_2'$ and $B_1-B_2'$ and amplifier 122.

Figure 4:
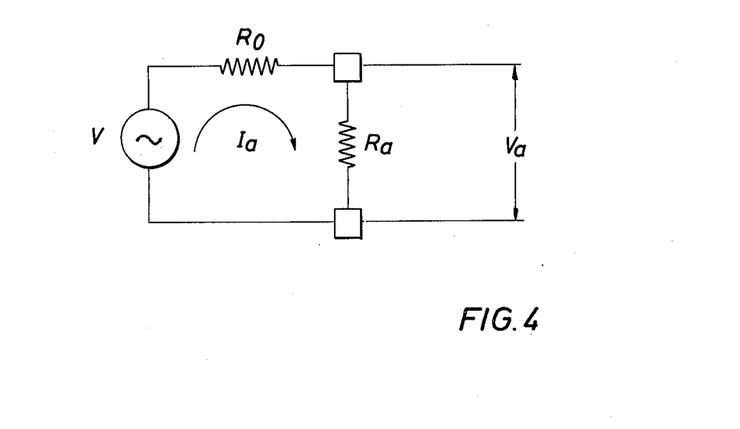
FIG. 4 is a schematic representation of a simplified circuit that demonstrates the principles of OHM'S Law for purposes of explaining the theory involved in the method and apparatus of the present invention.

Referring now to FIG. 4, there is shown a schematic representation of a circuit demonstrating the principles of OHM's Law. The circuit utilizes a voltage source "V" with a series output resistance $R_o$ to impress a current "$I_a$" into resistance "$R_a$" which represents the formation resistance. Impressing $I_a$ into $R_a$ develops a potential "$V_a$" across $R_a$. $R_o$ has a unique value which will provide the minimum and maximum value of $V_a$ and $I_a$. This unique value of $R_o$ can be shown by simple algebraic munipulation to be the geometric means of the preselected minimum and maximum value of $R_a$. Thus the minimum range of $V_a$ and $I_a$ is the square root of the dynamic range ratio of $R_a$. By way of example, if the assumed range of $R_a$ is from 1 to 10,000 ohms and $R_o$ is chosen as 100 ohms it is seen that while the objective measurement of $R_a$ varies over a range ratio of 10,000 to 1, the dynamic range ratio for $I_a$ and $V_a$ are both on the order of 100 to 1. Accordingly, as the absolute ranges of values $I_a$ and $V_a$ scale proportionately with changes in V, the value of the reference voltage V may therefore be used to adjust these ranges to be compatible with range requirements of the linear measurement electronics. Further, the dynamic range ratios of $V_a$ and $I_a$ are unaffected by changes in V and are determined solely by the value of $R_o$.

The dynamic range ratios of the measured variables in the dual focused log 16 are reduced if the measured voltage and current for both the deep and shallow measurements are constrained to obey the relationship satisfied by $I_a$ and $V_a$ in the circuit of FIG. 4. Additionally, this constraint must be done without disrupting the connection requirements for the dual measurement as previously described for the circuits shown in FIGS. 2 and 3.

The voltage for the deep measurement which corresponds to $V_a$ is a potential difference at frequency $f_1$ between the electrode pair $M_1-M_1'$ and the remote potential reference electrode. This potential difference has been designated as $V_{2D}$. The current for the deep measurement which corresponds to $I_a$ is the current $I_{1D}$, at frequency $f_1$ that flows from electrode $A_o$ into the formation. Rather than force $V_{2D}$ and $I_{1D}$ to bear the proper relationship to reduce the dynamic range ratio, the deep measurement excitation current, $I_{OD}$, shown on conductor 52 of FIG. 2 is used instead. Although electronic circuits could be implemented to satisfy all the requirements, considerable simplifications results if the current-voltage relationships defined by the circuit of FIG. 4 are satisfied only approximately.

Figure 5:
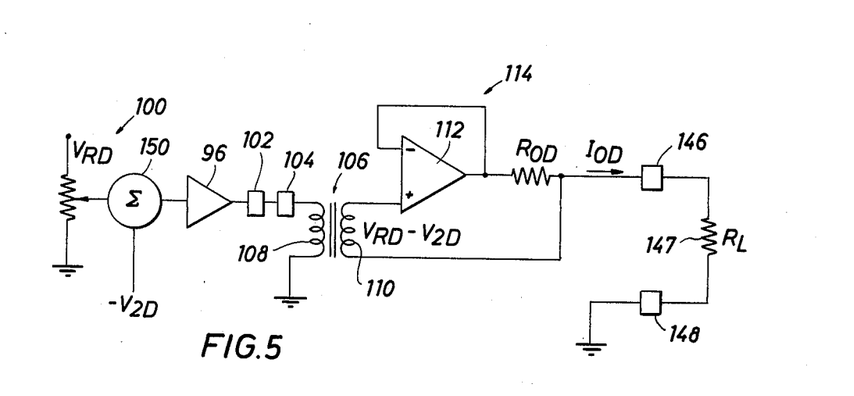
FIG. 5 is a schematic representation of an idealized circuit for maintaining the proportionality constant of the circuit excitation.

Referring now to FIG. 5, a schematic representation of a circuit for controlling the deep measure excitation current, $I_{OD}$, is depicted. As in FIG. 2, a deep reference voltage, $V_{RD}$, which has a preselected amplitude is developed in DC reference source 100. The $V_{RD}$ voltage signal and a $-V_{2D}$ voltage signal, developed in phase-sensing detector 88, are coupled into a summing network 150 with the combined signal output thereafter coupled into amplifier 96. As is well known in the art, conventional electronic amplifiers such as amplifier 96 provide a summing function. However, a summing network 150 is shown in FIG. 5 to aid in understanding the operation of the present invention.

As above-described, the combined signal is next coupled through chopper 102 to develop a square wave signal at the preselected frequency, $f_1$, which has an amplitude functionally related to the deep measurement voltage $V_{2D}$. Thereafter, the square wave signal is coupled through a narrow band-pass filter 104 to develop the desired sinusoidal signal which is then coupled through the primary coil 108 of transformer 106 to develop the required voltage potential, $V_{RD}-V_{2D}$, across the secondary coil 110 thereof. Coupling the transformer potential into current amplifier 114 establishes the relationship required, wherein $I_{OD} R_{OD} = V_{RD} - V_{2D}$.

Since changes in $I_{OD}$ caused by changes in the formation resistivity lateral to the borehole are approximately proportional to corresponding changes in $I_{1D}$, the current impressed into the formation from electrode $A_0$ at frequency $f_1$, a constant of proportionality designated by K, is combined with the series output resistor $R_{OD}$ such that the relationship required by the circuit depicted in FIG. 5 then becomes $I_{1D}(KR_{OD}) \approx V_{RD} - V_{2D}$. Values in this relationship approximately correspond to values developed in the discussion of the circuit in FIG. 4 in that $I_{1D}$ approximates $I_a$, $V_{2D}$ approximates $V_a$, $KR_{OD}$ approximates $R_o$ and $V_{RD}$ approximates V. It can thus be seen that the dynamic ranges of the currents and voltages recorded for the deep measurements are controlled by the parameters $V_{2D}$ and $KR_{OD}$.

Figure 6:
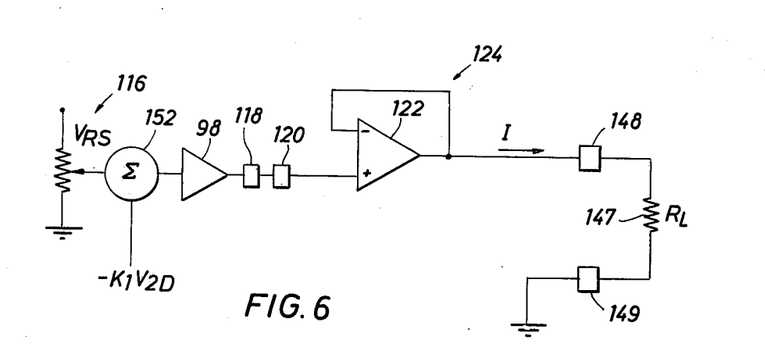
FIG. 6 is a schematic representation of an idealized circuit for maintaining the proportionality constant of the voltage excitation.

Referring now to FIG. 6, a simplified schematic representation of the circuit depicted in FIG. 3 is shown. Again, a DC reference voltage, $V_{RS}$ having predetermined value, which is different than $V_{RD}$, is provided by reference source 116 and is coupled into summing network 152. Also, the DC voltage, $-V_{2D}$, functionally related to the amplitude of the measured potential at frequency $f_1$ is coupled into the summing network 152 with the combined signal coupled into amplifier 98. Since, as has been hereinbefore explained, the combined signal will be used to drive a voltage amplifier, the signal is scaled to provide convenient measure signal amplitudes. Accordingly, any conventional means, such as a voltage divider network, may be utilized to scale signal $V_{2D}$, with such scaling represented by $K_1$. Thus, the measured DC voltage coupled into summing network 152 becomes $-K_1 V_{2D}$. Again, conventional electronic amplifiers combine the summation and amplification functions into one linear circuit.

Further, the ratio $V_{2S}/I_{1S}$ is approximately proportional to the ratio $V_{2D}/I_{1D}$ over most of the range of formation resistivity variations and since the dynamic ranges of $V_{2D}$ and $I_{1D}$ have already been controlled by the circuit of FIG. 5, it is necessary only to have $V_{2S}$ be proportional to $V_{2D}$ to control the dynamic range of both $V_{2S}$ and $I_{1S}$. Although such control is possible, it is simpler to cause the shallow measurement excitation voltage $V_{OS}$ to be proportional to $V_{2D}$ over the range of formation resistivity variations so that proportionality for $V_{OS}$ is tantamount to proportionality for $V_{2S}$.

Still referring to FIG. 6, it may be seen that $V_{OS}$ is derived directly from $V_{2D}$. Because the proportionality relationship between $V_{2S}$ and $V_{OS}$ is only approximate it is desirable to slightly modify the relationship between $V_{OS}$ and $V_{2D}$ by the addition of a small amount of constant voltage which predetermines the value of $V_{RS}$. This more nearly achieves the desired proportional relationship between $V_{2D}$ and $V_{2S}$ whereby control of the dynamic range of $V_{2S}$ and $I_{1S}$ is tied to $V_{2D}$ which in turn is controlled by the above-discussed circuit of FIG. 5.

As above-described, the combined signal is coupled through chopper 118 and narrow band-pass filter 120 to develop the required sinusoidal signal at shallow measurement frequency $f_2$, which is used to drive the voltage amplifier 124 to develop a potential difference between electrodes 148 and 149 across formation resistance $R_L$ which is essentially $V_{RS} - K_1 V_{2D}$. The ratio $V_{2S}/I_{1S}$ is approximately proportional to the ratio $V_{2D}/I_{1D}$ over most of the range of formation resistivity variations. Since the dynamic ranges of $V_{2D}$ and $I_{1D}$ have already been controlled by the circuit in FIG. 5, it is necessary only to have $V_{2S}$ be proportional to $V_{2D}$ to control the dynamic range of both $V_{2S}$ and $I_{1S}$ and tied to $V_{2D}$ which is controlled by the circuit of FIG. 5.

Referring again to FIG. 2, it is thus seen that the above-described interconnections provide for measurements of signals necessary to derive the apparent formation resistivity which have reduced dynamic ranges. As a result, the currents, $I_{1D}$ and $I_{1S}$, which are impressed into the formation from electrode $A_o$ and allowed to vary in accordance with changing resistivities of the formation to provide zero potential difference between shorted electrode pairs $M_1-M_1'$ and $M_2-M_2'$, can be measured to develop voltage signals, $V_{1D}$ and $V_{1S}$, which are respectively proportional to the above-mentioned output currents. Voltages signals $V_{1D}$ and $V_{1S}$ are coupled into telemetry transmitter/encoder 74 through input port 76 and 78 respectively. Similarly, the potentials across the formation resistivities for both the deep and shallow measurements are sensed by shorted electrode pair $M_1-M_1'$ with the signal compared to the remote potential reference indicated at 51 in FIG. 1, to develop deep and shallow potentials $V_{2D}$ and $V_{2S}$ which are coupled into telemetry transmitter/encoder 74 through input ports 94, 92 respectively.

Transmitter/encoder 74 encodes the received voltages $V_{1S}$, $V_{1D}$, $V_{2S}$ and $V_{2D}$ transmits them, via conductor 77 and 93 contained in logging cable 18, to the telemetry receiver 22 on the earth's surface, as shown in FIG. 1. The received signals are decoded and processed according to conventional means.

Figure 7:
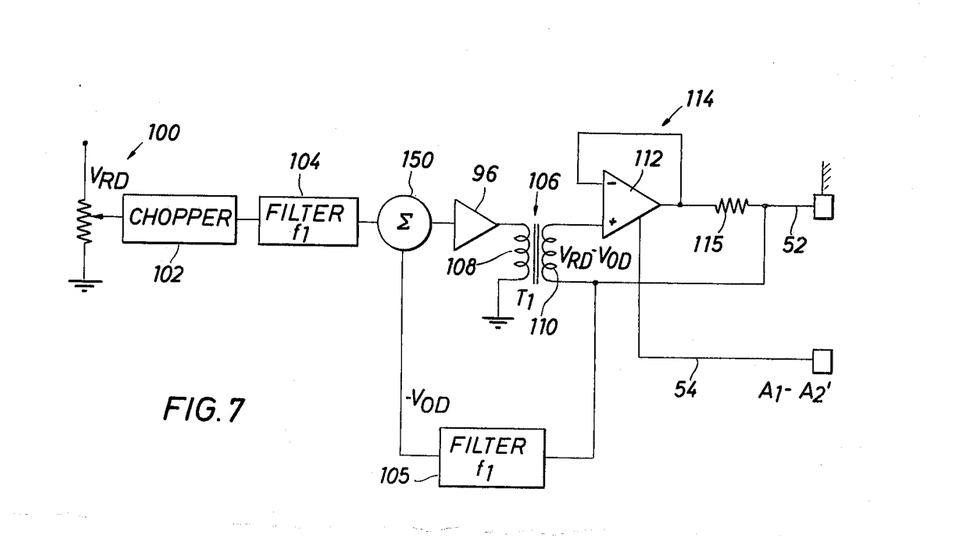
FIG. 7 is a schematic representation of an alternate embodiment of the drive circuit and current amplifier of FIG. 5.

Referring now to FIG. 7, an alternate embodiment for controlling the dynamic range ratios of the deep measurement voltage and current is depicted. In this embodiment the reference DC voltage, $V_{RD}$, is again provided by a DC reference source 100. Signal $V_{RD}$ is coupled directly into chopper 102, again operating at the preselected deep frequency $f_1$. The square wave, at frequency $f_1$, is coupled into narrow band-pass filter 104 to develop the sinusoidal signal required. This signal is then coupled into summing network 150 as is a voltage, $V_{OD}$, which is developed between the remote current electrode 18 and electrode pair $A_1-A_2'$. Voltage signal, $V_{OD}$, is coupled into summation network 150 through a band-pass filter operating at a frequency $f_1$ so that the circuit of FIG. 7 satisfies the relationship $I_{OD}R_{OD}=V_{RD}-V_{OD}$. Again, changes in $I_{OD}$ caused by changes in the resistivity of the formation lateral to the borehole are approximately proportional to corresponding changes in $I_{1D}$ and the voltage developed between the remote current reference electrode 18 and electrode pair $A_1-A_2$ is approximately proportional to the voltage $V_{2D}$. Again, proportioning the series output resistor, as indicated by the constant of proportionality, K, the relationship described by the circuit of FIG. 7 becomes $I_{1D}(KR_{OD}) \simeq V_{RD}-V_{OD}$.

Thus, this circuit functions to reduce the dynamic range in a manner similar to that in FIGS. 2 and 5 except that the reference and control signals are summed at frequency $f_1$ instead of at DC levels, as in the case of the circuit described in FIGS. 2 and 5.

Accordingly, while particular embodiments of the present invention have been illustrated and described, it will be apparent to those skilled in the art that changes and modifications may be made without departing from the invention in its broader aspects.

The embodiments of the invention in which an exclusive property or privilege is claimed are defined as follows:

1. A method for reducing the dynamic range of induced voltages and currents measured in an earth formation by a logging instrument traversing a borehole therethrough and which induced voltage and currents vary directly as the resistivity of the earth formation surrounding the borehole varies, with the measured voltages and currents thereafter utilized in deriving ratios for determining the apparent resistivity of the earth formations surrounding the borehole, comprising the steps of:

generating first and second excitation currents at first and second frequencies, $f_1$ and $f_2$, respectively;

measuring the induced formation voltages and currents; and controlling the magnitude of said generated first and second excitation currents producing said earth formation voltages and currents in response to a linear combination of one of said measured earth formation voltages or currents with first and second reference voltages, such that variations in said earth formation voltages and currents resulting from said variations in the resistivity of the earth formation effect a reduction in the dynamic measurement ranges of said earth formation voltages and currents.

2. The method described in claim 1 wherein said step of generating said first and second excitation currents at said first and second frequencies, $f_1$ and $f_2$, comprises the additional steps of:

deriving a DC voltage level from said selected parameter;

combining said derived DC voltage level linearly with a first DC reference voltage to produce a first combination voltage;

combining said derived DC voltage linearly with a second DC reference voltage to produce a second combined voltage;

deriving first and second sinusoidal signals at first and second frequencies, $f_1$ and $f_2$, respectively, from said first and second combination voltages, respectively; and thereafter coupling said first and second sinusoidal signals into first and second amplifiers at said first and second frequencies, $f_1$ and $f_2$, for generating said first and second excitation currents, respectively.

3. The method described in claim 2 wherein said step of amplifying said first and second sinusoidal signals comprises coupling said first sinusoidal signal at said first frequency $f_1$ into an operational amplifier interconnected in a current amplifier configuration; and coupling said second sinusoidal signal at frequency $f_2$ into an operational amplifier interconnected in a voltage amplifier configuration.

4. The method described in claim 1 wherein said step of generating said first excitation current comprises the additional steps of generating an AC reference voltage signal at said first frequency, $f_1$, and thereafter:

deriving an AC voltage signal at said first frequency, $f_1$, functionally related to the amplitude of said selected parameter;

combining said AC reference voltage signal and said derived AC voltage signal to produce a composite AC signal; and coupling said AC composite signal into an operational amplifier interconnected in a current amplifier configuration for generating said first excitation current.

5. An apparatus for reducing the dynamic ranges of voltages and currents measured in an earth formation by a logging instrument traversing a borehole therethrough, comprising:

a plurality of electrodes adapted for movement through a borehole, said electrodes comprising a central current emitting electrode, first and second pairs of measurement electrodes positioned symmetrically about said central electrode and first and second pairs of current emitting electrodes positioned symmetrically about said central electrode and further therefrom than said measurement electrode pairs, each of said electrode pairs respectively short circuited;

means for sampling electrical potential signals developed between said first pair of measurement electrodes and a remote potential reference electrode as a result of detecting voltages and currents impressed across the various resistivities of the earth formations surrounding the borehole;

means for generating first and second excitation currents at first and second frequencies, $f_1$ and $f_2$, respectively in functional relationship to said sampled signal;

said second excitation current generating means including means for deriving a first DC voltage signal functionally related to the amplitude of that portion of the electrical signal produced by said first pair of measurement electrodes as a result of detecting voltage and currents impressed across the various resistivities of the earth formation by said second frequency, $f_2$, a source for a second DC reference voltage, means for combining said first DC voltage signal and said second DC reference voltage to produce a second combined signal, means for deriving a second sinusoidal signal at said second frequency, $f_2$, from said second combined signal, amplifier means responsive to said second sinusoidal signal at said second frequency, $f_2$, for generating said second excitation current;

means for impressing said first generated excitation current through said earth formation between said first and second current emitting electrode pairs and a remote current electrode return path to produce earth formation currents functionally related to said frequency $f_1$;

means for impressing said second excitation current on the earth formation in the form of a potential difference developed between the first and second current emitting electrode pairs, said potential difference functionally related to said second frequency, $f_2$.

6. The apparatus described in claim 5, wherein said first excitation current generating means includes:

means for deriving a first DC voltage signal functionally related to the amplitude of that portion of the electrical signal produced by said first pair of measurement electrodes as a result of detecting voltage and currents impressed across the various resistivities of the earth formation by said first frequency, $f_1$;

a source of a first DC reference voltage;

means for combining said first DC voltage signal and said first DC reference voltage to produce a first combined signal;

means for deriving a first sinusoidal signal at said first frequency, $f_1$ from said first combined signal;

amplifier means responsive to said first sinusoidal signal at said first frequency, $f_1$, for generating said first excitation current.

7. The apparatus described in claim 5, wherein said first excitation current generating means includes:

means for deriving a first DC voltage signal functionally related to the excitation current impressed on said earth formation, between said first and second current electrode pairs and said remote current electrode at first frequency, $f_1$;

a source of a first DC reference voltage;

means responsive to said first DC reference voltage for developing an AC reference signal at said first frequency, $f_1$;

means for combining said first AC voltage signal and said AC reference signal to produce a composite AC signal;

amplifier means responsive to said composite sinusoidal signal at said first frequency, $f_1$, for generating said first excitation current.

8. The apparatus described in claim 6 or 7, wherein said means for impressing said first and second generated excitation currents through said earth formation comprises:

a first operational amplifier interconnected in a current amplifier configuration and having a first output connected to said remote current electrode return path and a second output interconnected to said first pair of current emitting electrodes;

a second operational amplifier interconnected in a voltage amplifier configuration and having a first output connected to said second pair of current emitting electrodes and a second output interconnected to said first pair of current emitting electrodes.

* * * * *